D. HUMPHREY.
PROCESS FOR PRODUCING CARBONATED BEVERAGES.
APPLICATION FILED APR. 14, 1915.

1,243,068.

Patented Oct. 16, 1917.
4 SHEETS—SHEET 4.

WITNESSES:

INVENTOR
David Humphrey
BY
Fisher & Moser
ATTORNEYS

UNITED STATES PATENT OFFICE.

DAVID HUMPHREY, OF CLEVELAND, OHIO.

PROCESS FOR PRODUCING CARBONATED BEVERAGES.

1,243,068.  Specification of Letters Patent.  Patented Oct. 16, 1917.

Application filed April 14, 1915.  Serial No. 21,210.

*To all whom it may concern:*

Be it known that DAVID HUMPHREY, a citizen of the United States, residing at Cleveland, in the county of Cuyahoga and State of Ohio, has invented certain new and useful Improvements in Processes for Producing Carbonated Beverages, of which the following is a specification.

This invention comprises an improved process for producing carbonated beverages, particularly syrupy mixtures, all substantially as herein shown and described and more particularly pointed out in the claims.

In the accompanying drawings, Figure 1 is a perspective view of the machine in which the carbonation of the liquid takes place, and Fig. 2 is a diagrammatic view of one form of apparatus adapted to carry on my improved process, the relations of the parts being somewhat arbitrary to show a full working equipment.

Heretofore, the practice has been to carbonate water as a first step and subsequently mix the carbonated water with other materials to produce a carbonated beverage. The present invention differs primarily from the former practice in that the water and other products making up the beverage, such as water and syrup, are mixed together in the proper proportions and subsequently carbonated, thereby producing a product which is practically all froth or foam. If this product is permitted to liquefy in the open atmosphere, a liquid beverage is obtained, but obviously the effect of carbonation is largely lost. Now I have discovered that a palatable and more or less effervescent beverage can be made and dispensed by maintaining the mixture and frothy product at a low temperature and causing liquefaction of the frothy product to take place in a closed vessel in the presence of the carbonated gas.

Figure 1:
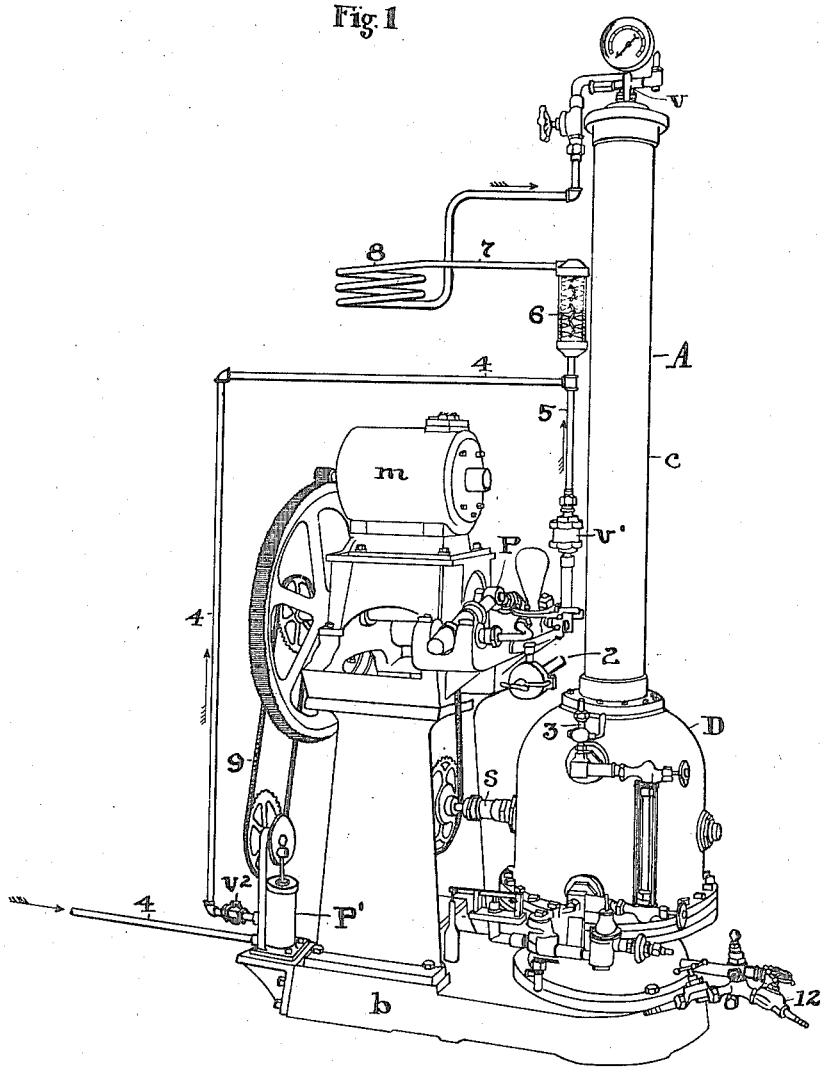

In brief, the carbonated gas is not lost but is retained, liquefaction taking place under the pressure of the gas in the system or apparatus. The particular form or make of carbonator is not essential, but describing the invention more in detail, and referring to Fig. 1, I prefer to use a carbonator A which will work automatically and use power only when its pumps P are in operation. Except for certain modifications, the embodiment disclosed in Fig. 1 is not claimed herein as entirely new and original with me, especially the portion represented by the drum D and the column $c$ thereon; the spray valve $v$ at the top of the column through which the liquid is practically atomized into the column; the electric motor $m$ and the pump P driven thereby to force the liquid forward into said column; all of said parts being mounted on a suitable base $b$ with a pedestal for the motor and the mechanism otherwise mounted thereon.

Figure 2:
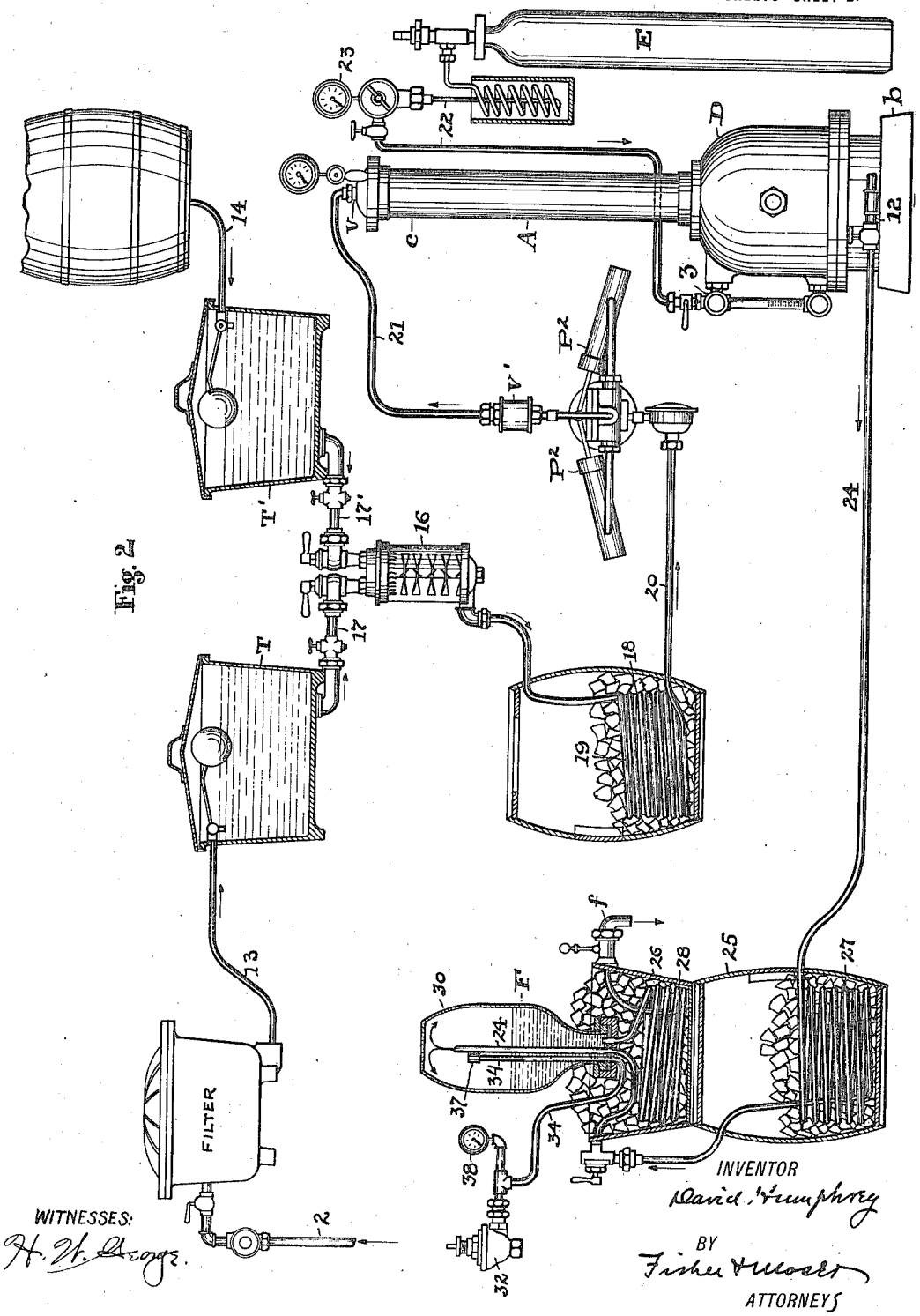

In practice, the column $c$ is filled with small pebbles, and the fluid and gas are supposed to become thoroughly commingled and intermixed in the passage of the liquid downward through these pebbles and the gas upward, thus bringing the combination into suitable form to be finally mixed and incorporated by means of the beaters in the dome D and which are driven by shaft $s$ and sprocket chain from the electric motor $m$. The internal parts, such as the pebbles and the beaters referred to, are not shown because they pertain to old machines and are old and well known to those skilled in this art, and my invention, so far as this figure is concerned, is confined mainly to the added parts and which are not acknowledged to be old. Thus, in adapting the apparatus to incorporate a syrup or mixture with pure water the carbonation of which was provided for in the original machine and to which it was limited, it became necessary to equip the machine with means to handle the syrup mixture with the pure water and to carbonate the mixture. The carbonic gas was then and is now furnished through the jet 3 and thence by coupling into the side of the dome or chamber D, and the pure water enters by pipe 2 and the syrup mixture by pipe 4. Thus, by adding means to incorporate a syrup mixture with the otherwise pure water carbonating machine, I have made a new apparatus as a whole, and also a new drink. But this change also imported certain difficulties to be overcome, such, for example, as excessive frothing and foaming at the tap by reason of the added syrups and which renders the product unusable in this form. Hence, I have provided the syrup mixture pipe line 4, Fig. 1, which has its source of supply through the pump P' in said line as a forcing medium into the water supply pipe 5 and through the mixer 6, which may have vanes or blades or like means so disposed as to cause intermixture of the two liquids before discharging into column c, thorough admixture being of the first importance. Thence, the fluid passes forward under the sustained pressure of the two pumps, P and P', into said column c by pipe 7 and the cooling coil 8 therein. Pump P' is driven by sprocket chain 9 from the motor driven mechanism actuating pump P', but any suitable power connections therefor may be employed. The gas enters the dome D behind the nipple 3 to which the gas supply tank E, Fig. 2, is connected, and the gas naturally finds its way upward in column c under its own pressure, and where it meets the downwardly percolating liquid from above as already described. A check valve v' is provided in pipe 5, and a like valve v² in line 4 to avoid back pressures. The carbonated mixture issues directly from the base of dome D at 12, from which I extend a pipe or hose connection 24 to a settling and condensing apparatus F as indicated in Figs. 2 and 3, and also in Fig. 4 in a more enlarged form, and which has a draft tap or faucet f as seen in Figs. 2 and 4.

Figure 5:
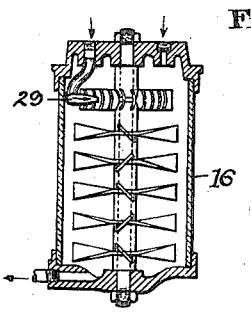
Fig. 5 is a sectional elevation of a liquid mixer shown in the supply line, Fig. 2.

In Fig. 2, I show a water supply tank T and a syrup tank T' connected, respectively, with their sources of supply by pipes 13 and 14 respectively, and each inclosed or covered and having a float controlled inlet so as not to overflow. The said tanks commingle their contents in or through a mixer 16 connected therewith by valve controlled pipes 17 and 17', whence the admixture flows to a cooler 18, which is shown as having a coil 19 submerged in ice. From said cooler the liquid is conducted through pipe 20 and forced by the pump or set of pumps P² through pipe 21 into the top of column c of carbonator A, and the gas supply to dome D is from the gas jar or vessel E by pipe 22 having a pressure gage 23 connected therewith. Suitable cocks and valves in the several pipe lines are supplied as needed, and the initial mixer 16 may be equipped with a jet 29 and a rotary spindle and inclined blades see Fig. 5, or the blades may be arranged to rotate independently on the spindle by the passage of the water through the mixing cylinder, which is of glass, preferably.

Figure 6:
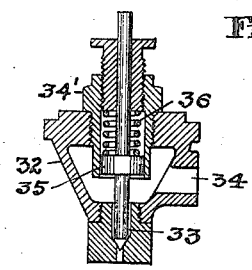
Fig. 6 is an enlarged sectional elevation of pressure relieving valve shown otherwise in connection with the condenser, Fig. 2.

From the base of the carbonator dome D, the mixed carbonated liquid flows as a foam or froth by pipe 24 to the condensing or liquefying vessel 30, this flow being through a cooling coil 27 inclosed in a barrel shaped vessel 25 containing ice. The so called liquefier comprises a glass bottle 30 supported on or in a tub or vessel 26 containing ice, and this liquefier is of a size and character where liquefaction of the foaming mixture will be maintained co-extensively with more or less rapid draft at faucet f. The pipe extension 24 enters the bottom and discharges like a fountain into the top of said liquefier, and the liquid product flows out at the bottom to faucet f through the cooling coil 28 in the tub 26. Liquefaction takes place under the pressure and in the presence of the gas from carbonator A and gas tank E, but excess of pressure in said bottle may be relieved by suitable safety pressure means, for example, such as shown in Figs. 2 and 6, the latter view disclosing a valve body 32 having an escape orifice in its bottom controlled by a valve 33. A thimble 34' is set into said body from above, and the stem of said valve 33 has a collar or piston 35 fixed thereon and exposed in said thimble to the fluid pressure from the bottle 30 through the pipe 34 and adapted to raise said valve from its seat against the spring 36 in said thimble when the pressure is sufficient to overcome the spring. A cap 37 at the intake or top end of pipe 34, Fig. 4, prevents liquid from entering the pipe but is otherwise open at its bottom to afford an exit for the gas under excessive pressures. The pressure gage 38 shows the existing pressure, which, of course, varies more or less as the liquid is drawn off through faucet f.

Figure 3:
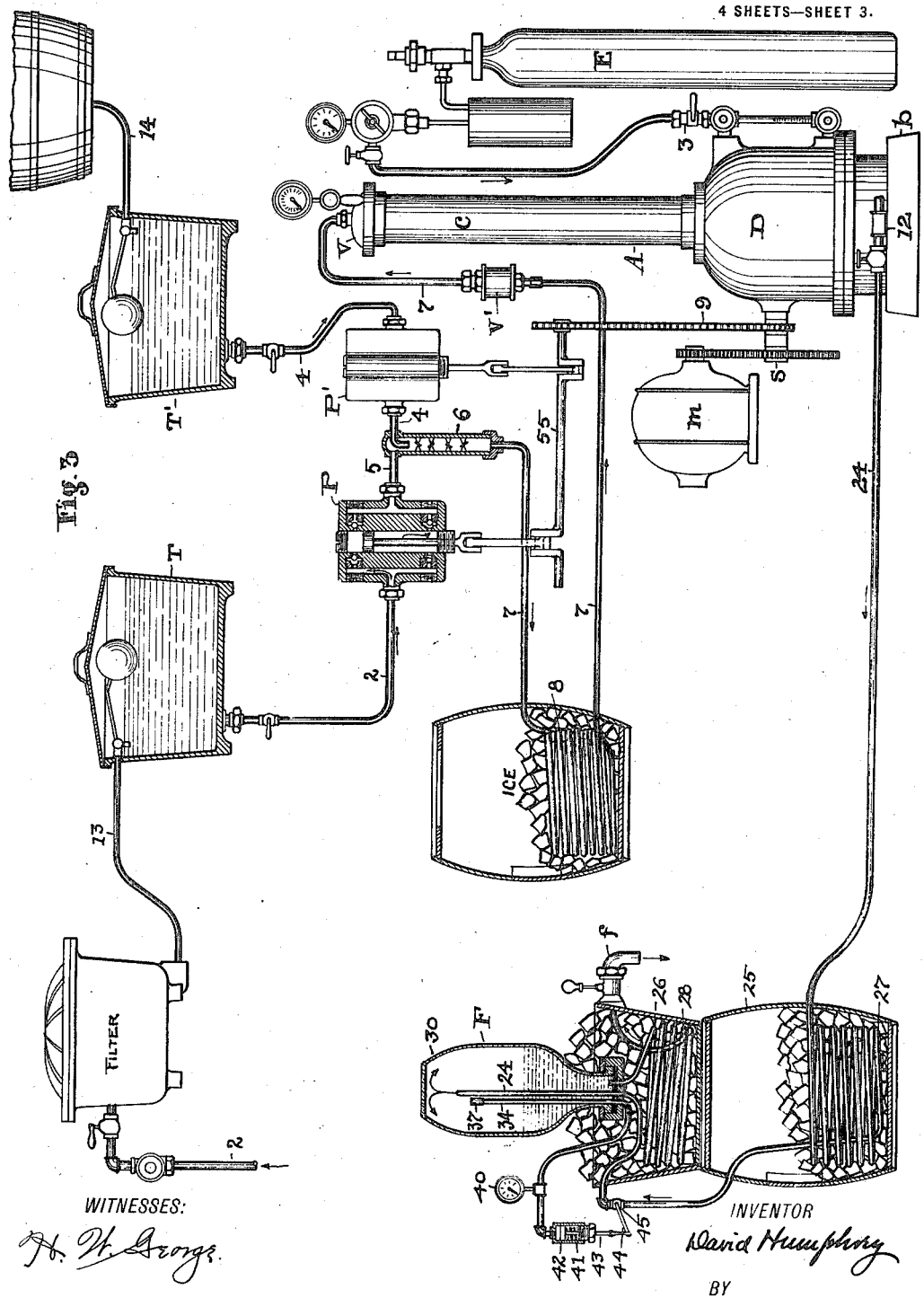
Fig. 3 is a view corresponding in the main to Fig. 2, but with certain modifications, particularly in the means employed for forcing the liquid into the carbonator proper, as will appear more fully in the general description.
Figure 4:
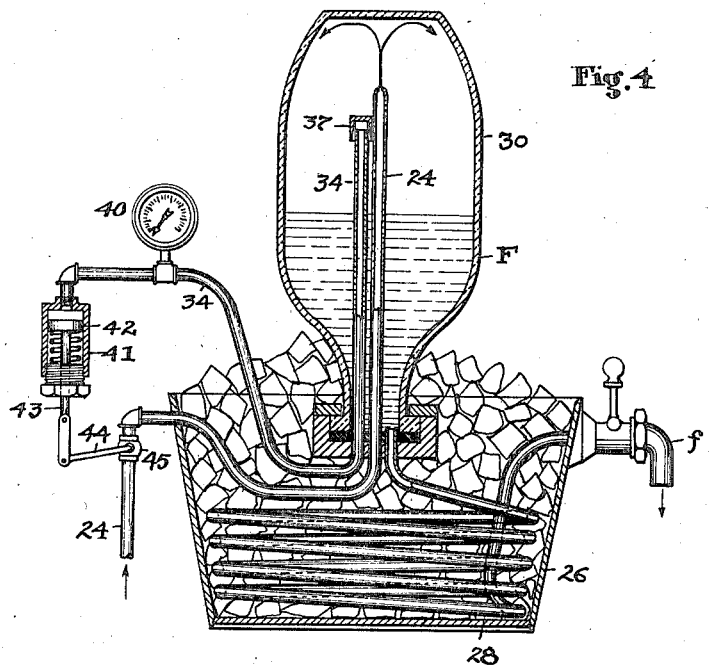
Fig. 4 is a sectional elevation of a liquefier and dispensing vessel for the carbonated mixture.

A modification of the foregoing relief mechanism appears in Figs. 3 and 4, wherein the pipe 34 carries a pressure gage 40 and relief mechanism comprising a cylinder 41 containing a spring sustained piston 42 on a rod 43. The said rod is connected by a link and lever 44 with a rotatable valve 45 in the liquid supply pipe 24 leading to the liquefier 30. Hence, any excess of pressure in the bottle 30 will manifest itself in the depression of piston 42 and proportionately close the valve 45, thus reducing or cutting off said pressure, and further feed of the frothy mixture. Opening of the faucet and withdrawal of liquid relieves the pressure in cylinder 41 and this permits valve 45 to be opened by the spring beneath piston 42. Fig. 3 also illustrates in diagrammatic form the connections and associated elements for carbonator A shown in Fig. 1. Thus, the water supply tank T and the syrup mixture tank T' are connected directly to pumps P and P' which force the two fluids into mixer 6 through the separate pipes 4 and 5, and thence through pipe line 7 having a cooling coil 8 into the top of the column c. The said pumps are actuated from a crank shaft 55 driven through suitable transmitting mechanism from the electric or other motor m. The carbonated frothy mixture passes from carbonator A by a pipe 24 to the liquefier 30 and finally out in a drinkable form through faucet f, as hereinbefore described.

From the foregoing description and the devices shown the deduction is clear that the invention is designed to supply a carbonated mixed drink, and especially such as carries a suitable supply of syrup or sweetening and flavoring in addition to the plain water formerly used. Experience has demonstrated that such a mixed drink cannot be produced by the original carbonating machine alone on account of its tendency to excessive foaming and frothing when liberated, and hence I have taken other steps and devised the other and additional means shown and described to reduce the frothy product to a liquid form without losing the effect of carbonation and before drawing it off as an effervescent beverage. In practising the invention, the first step is to mix the water and syrup mixture in proper proportions; the second step, is to carbonate the mixed liquid, and the third step is to liquefy the foaming mixture resulting from the second step. The second and third steps are carried out under more or less constant gaseous pressure from the carbonating gas tank E through the carbonator A to the tap or faucet f, only that excess of pressure is relieved by the relief devices shown and described. The liquids and mixture is also maintained at a low temperature during the operations to permit the desired results to be effected, a temperature slightly above 32° Fahrenheit giving the best results.

The liquefier 30 is of such size as to provide a sustained flow of liquid to a more or less continuous draft through faucet f, as an apparatus like this, installed at a popular refreshment stand, is liable to be heavily taxed for supply at times, and the internal pressure of gas in the dome of chamber or bottle 30 is supposed to be maintained at such a degree as will always prevent liquid overflow through the safety pipe 34. An apparatus of this kind is of especial value and untility in dispensing an effervescent ginger beverage from faucets or taps at refreshment stands located outdoors at summer resorts, as the process and apparatus permits the handling and mixing of all such liquids or fluids under close confinement without exposure or contamination to dust, dirt, etc. The process and apparatus is sanitary; also economical in operation, as no loss or waste occurs in preparing or dispensing the beverage; also a live, palatable effervescent drink is served direct from the tap or faucet; and the apparatus and operation thereof makes an attractive display which assists materially in promoting the sale of the beverage.

What I claim is:

1. A process of producing effervescent beverages, consisting in mixing different fluids in any desired proportions; then carbonating this mixture as produced; and finally liquefying the carbonated product in the presence of and under more or less pressure of carbonating gas.

2. A process of producing effervescent beverages for withdrawal at a tap or faucet, consisting in mixing different liquids and carbonating the mixture produced, and subsequently liquefying the mixture in the presence of carbonating gas concurrently with the withdrawal thereof from the tap or faucet.

3. A process of producing effervescent beverages, consisting in subjecting mixed liquids to a carbonating gas and subsequently liquefying the product thereof under confinement in the presence of the inherent gases.

4. A process of producing effervescent beverages, consisting in mixing a syrup compound and carbonating the resultant mixture, and then liquefying the carbonated product under close confinement in the presence of a carbonating gas.

5. A process of producing effervescent beverages, consisting in mixing different liquids, carbonating the resultant mixture, and liquefying the said mixture at a relatively low temperature under the pressure and in the presence of a carbonating gas.

6. A process of producing carbonated beverages, consisting in mixing water and a syrupy fluid; forcing the resultant mixture at a low temperature into a carbonating device; subjecting the mixture in said device to a carbonating gas; and liquefying the carbonated product at a low temperature under close confinement in the presence of the said carbonating gas.

7. A process of producing carbonated beverages, consisting in mixing a syrupy compound; carbonating the resultant mixture; liquefying the carbonated product under close confinement in the presence and while under the pressure of the carbonating gas; and relieving the liquefied product at intervals of excessive pressures of gas.

In testimony whereof I affix my signature in presence of two witnesses.

DAVID HUMPHREY.

Witnesses:
R. B. MOSER,
GEO. E. KRICKER.